US011363037B2

(12) United States Patent
Karin et al.

(10) Patent No.: US 11,363,037 B2
(45) Date of Patent: Jun. 14, 2022

(54) REAL-TIME DETECTION OF MALICIOUS ACTIVITY THROUGH COLLABORATIVE FILTERING

(71) Applicant: MICROSOFT TECHNOLOGY LICENSING, LLC., Redmond, WA (US)

(72) Inventors: Omer Karin, Tel Aviv (IL); Ram Haim Pliskin, Rishon Lezion (IL)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 201 days.

(21) Appl. No.: 16/371,578

(22) Filed: Apr. 1, 2019

(65) Prior Publication Data
US 2020/0314119 A1 Oct. 1, 2020

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC ............ H04L 63/1416; H04L 63/1425; H04L 63/1408; G06F 21/55; G06F 21/554; G06F 21/552
USPC .......................................................... 726/23
See application file for complete search history.

(56) References Cited

U.S. PATENT DOCUMENTS

| | | | |
|---|---|---|---|
| 7,814,542 B1* | 10/2010 | Day ....................... | G06F 21/552 726/22 |
| 8,990,944 B1 | 3/2015 | Singh et al. | |
| 9,350,748 B1* | 5/2016 | McClintock ........ | H04L 63/1491 |
| 2004/0078384 A1* | 4/2004 | Keir ....................... | G02B 6/105 |
| 2007/0011319 A1* | 1/2007 | McClure ................ | H04L 41/12 709/224 |
| 2007/0289017 A1 | 12/2007 | Copeland | |
| 2008/0263666 A1* | 10/2008 | Keohane ............. | H04L 63/1458 726/23 |
| 2011/0197278 A1* | 8/2011 | Chow .................. | H04L 63/1416 726/24 |
| 2013/0036469 A1* | 2/2013 | Worth ................. | H04L 63/1408 726/23 |
| 2015/0215334 A1 | 7/2015 | Bingham et al. | |

(Continued)

FOREIGN PATENT DOCUMENTS

KR 20080040257 A 6/2008

OTHER PUBLICATIONS

Victor, "ALS Implicit Collaborative Filtering", Retrieved From: https://medium.com/radon-dev/als-implicit-collaborative-filtering-5ed653ba39fe, Aug. 24, 2017, 14 Pages.

(Continued)

*Primary Examiner* — Mohammad W Reza (57) ABSTRACT

A machine compromised by malicious activity is detected by identifying an anomalous port opened on an entity of a network. The anomalous port is detected through collaborative filtering using usage patterns derived from normal network traffic using open ports of entities on the network. The collaborative filtering employs single value decomposition with alternating least squares to generate a recommendation score identifying whether an entity having a newly-opened port is likely to be used for malicious activity.

12 Claims, 4 Drawing Sheets

(56) References Cited

U.S. PATENT DOCUMENTS

2016/0149933 A1* 5/2016 Schrader ............ H04L 63/1491
726/23

OTHER PUBLICATIONS

Hu, et al , "Collaborative Filtering for Implicit Feedback Datasets", In Proceedings of Eighth IEEE International Conference on Data Mining, vol. 8, Dec. 15, 2008, 10 Pages.

Li, et al., "Matrix Completion via Alternating Least Square(ALS)", Retrieved from: http://stanford.edu/~rezab/classes/cme323/S15/notes/lec14.0f, May 13, 2015, pp. 1-4.

"International Search Report and Written Opinion Issued in PCT Application No. PCT/US2020/019844". dated May 15, 2020, 12 Pages.

* cited by examiner

REAL-TIME DETECTION OF MALICIOUS ACTIVITY THROUGH COLLABORATIVE FILTERING

BACKGROUND

The detection of a machine that has been subject to a malicious activity is a challenging task since the malicious attackers have improved their capabilities to evade detection. Most malicious attackers communicate over a network to find a vulnerable target. The bad actors often perform network scanning and/or port scanning before initiating an attack in order to obtain information on the network's structure and behavior. Network scanning is used to detect all active hosts on a network and their IP addresses. Port scanning is used to identify the ports and services of a host that are open. Ports are often the target of cyber criminals. Cyber criminals seek open ports in order to get access to the applications and services behind them.

Network attacks are not always immediately identifiable due to the complexity of the network and the number of open ports. Network intrusion detection systems and firewalls are often engaged to detect such malicious scans which typically rely on pre-configured rules. The pre-configured rules are based on the knowledge of previous attacks. However, the malicious actors have learned to avoid these types of detection techniques by varying the frequency of the scans, accessing ports out of order, and/or spoofing their source addresses.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The real-time detection of malicious activity on a network is performed by identifying anomalous activity on an open port. A model-based recommender system is used to represent normal activity on the open ports of an entity in a network. The model-based recommender system is used to determine the likelihood that a newly-opened port of an existing entity is either a non-anomalous port that is being used for legitimate workloads or an anomalous port used for malicious activity. The likelihood is based on a similarity of the newly-opened port being used for legitimate workloads on other entities.

In one aspect, collaborative filtering using implicit feedback datasets is used to predict whether the newly-opened port is used for malicious activity. A model or matrix of entity-port pairs is built from an analysis of the network traffic in order to determine the ports used in a legitimate workload. An entity-port pair is represented by the frequency an entity uses an open port based on the TCP SYN-ACK settings in the transmissions captured from network flow traffic. The raw observation values are transformed into preferences and confidence pairs.

The model is then decomposed using single value decomposition with alternating least squares to predict missing values. When a newly-opened port is detected on an existing entity, a recommendation score is computed and used to indicate whether or not the newly-open port is an anomalous port used for malicious activity.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a mechanism for detecting whether a machine (e.g., virtual machine, computing device, server etc.) has been compromised through the detection of anomalous activity on an open port. The mechanism employs a model-based recommender system to represent normal activity on open ports of each entity of a network in order to determine the likelihood that a newly-opened port of an entity is either a non-anomalous port that is being used for legitimate workloads or an anomalous port used for malicious activity. The likelihood is based on a recommendation score derived from the model-based recommender system.

The technique generates a model or matrix A of entity-port pairs, $r_{ui}$, where u is an entity and i is an open port on entity u. An entity-port pair, $r_{ui}$, represents the frequency that an entity u uses port i to transmit and/or receive transmissions. The TCP SYN-ACK settings in the transmissions captured in the network flow data is used to determine if port i is an open port. The raw observation values, $r_{ui}$, are transformed into preferences, $p_{ui}$, and then into confidence levels, $c_{ui}$.

The matrix A of size m×n is then decomposed, using singular value decomposition to, into two smaller matrices: X, of size m×f; and Y, of size f×n. X and Y are generated by randomly assigning values in X and Y and using alternating least squares iteratively to optimize X and fixing Y, and vice versa, until a best approximation of A is achieved. The vectors in X and the vectors in Y map entities and ports into a common latent factor space where they can be compared.

The technique disclosed herein is advantageous in several respects. The technique does not utilize an agent (e.g., component, extension or module) inside an entity. Instead the technique uses the network flow data that is captured within the network without interfering with the operation of an entity. The technique does not rely on pre-configured rules that cannot be altered quickly to accommodate changes in the network behavior. Instead, this technique is able to analyze network behavior in real-time so that malicious activity can be detected quickly.

Attention now turns for a more detailed description of an exemplary system using a model-based collaborative filtering technique with implicit datasets to detect an anomalous port.

System

Figure 1:
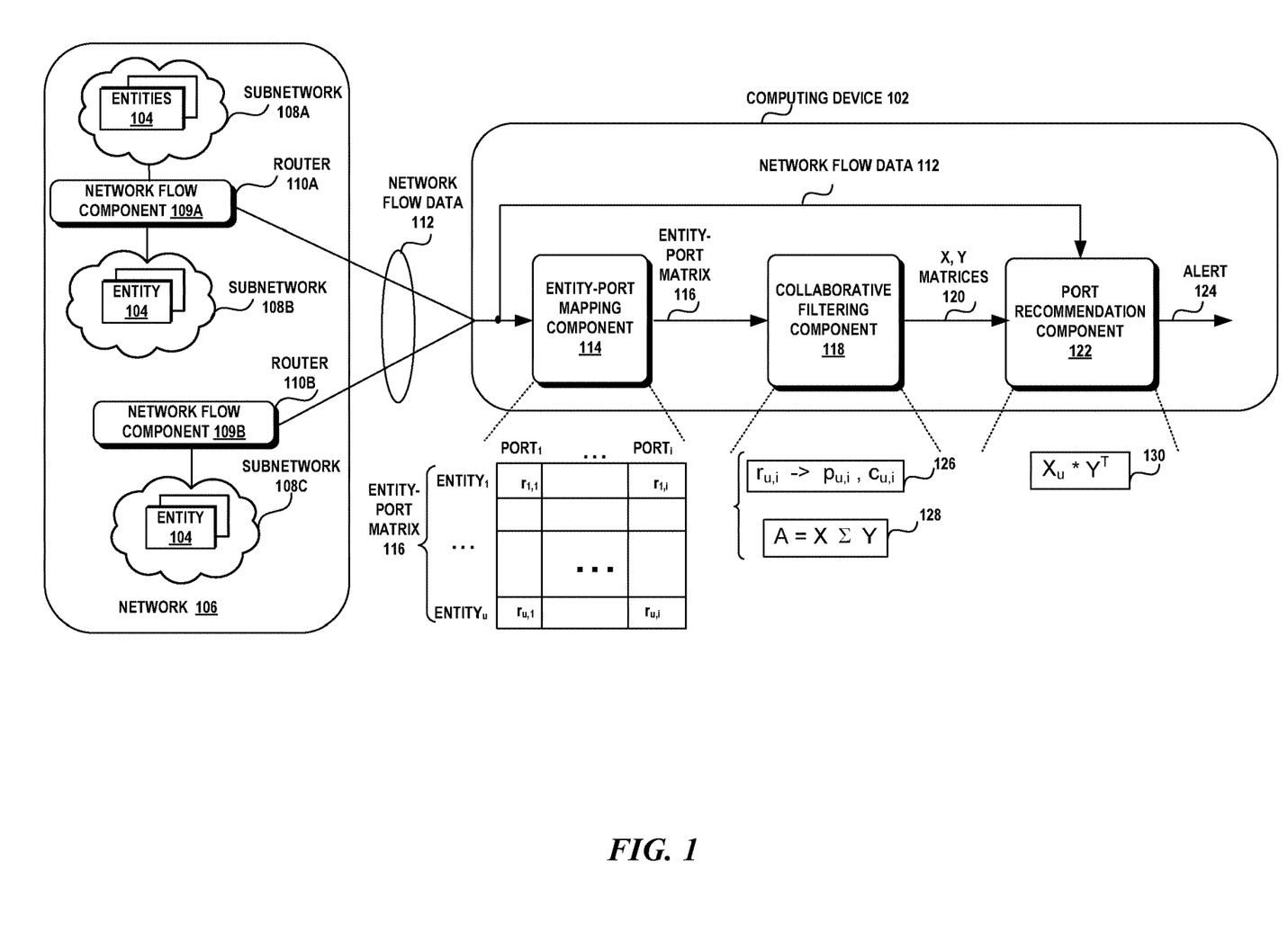
FIG. 1 illustrates an exemplary system for the real-time detection of malicious activity through collaborative filtering.

FIG. 1 illustrates an exemplary system 100 configured to facilitate the detection of a compromised machine through collaborative filtering. In one aspect, the system 100 includes a computing device 102 communicatively coupled to network entities or entities 104 of a network 106. An entity 104 may be coupled to a subnetwork 108A-108C (collectively, "108") and/or router 110 having the capability to transmit data packets through the network 106 to the computing device 102.

The computing device 102 may be a single computing device 102 or implemented as multiple servers. For instance, such servers may be part of a particular organization or company associated with network 106 and/or subnets 108, or may comprise cloud-based servers configured to provide network analysis and/or monitoring services for a plurality of organizations. Computing device 102 may include one or more of such server devices and/or other computing devices, co-located or located remote from each other. Furthermore, although FIG. 1 depicts a single computing device 102, it is understood that implementations may comprise any number of computing devices.

The network 106 and the subnetworks 108 may each include one or more of any of a local area network (LAN), a wide area network (WAN), a personal area network (PAN), a combination of communication networks, such as the Internet and/or a virtual network. The computing device 102 may be communicatively coupled to an entity 104 through the network and/or subnetwork. The communication between the computing device, router, network, and subnetworks, may be through application programming interfaces, and other techniques and interfaces. The computing device 102, routers 110, network 106, subnetworks 108 and entities 104 may each include at least one communication interface that facilitates communications between each other.

An entity 104 may comprise a node of the network 106 and/or subnetwork 108. An entity 104 may include any electronic device or machine (physical or virtual) coupled to any of the network 106 and/or subnets 108. In one example embodiment, network 106 and/or subnets 108 may collectively comprise a network of an organization (including but not limited to a company, business, or cloud-based subscription), and entities 104 may include a node (e.g., a physical device or machine, or a virtual node) coupled to the network 106. In some further example embodiments, network 106 and/or subnets 108 may comprise a virtual or cloud-based network, and entities 104 may comprise one or more virtual machines or nodes of the virtual or cloud-based network.

In some other examples, any of entities 104 may comprise a desktop computer, a portable computer, a smartphone, a tablet, a wearable computing device (e.g., a smart watch, a smart headset), a mixed and/or virtual reality device (e.g., Microsoft HoloLens™), or any other processing device. In some other example implementations, network 106 and/or subnets 108 may collectively comprise a cloud-computing network and entities 104 may be nodes coupled to the cloud-computing network. Entities 104 are not limited to processing devices in implementations, and may include other resources on a network, such as storage devices (e.g., physical storage devices, local storage devices, cloud-based storages, hard disk drives, solid state drives, random access memory (RAM) devices, etc.), databases, virtual machines, etc.

Each entity 104 is associated with at least one port. A port allows an entity 104 to support multiple communication sessions through a specific protocol with other entities on the network. A port is associated with the IP address of an entity 104. A port has a port number that identifies its associated protocol.

In the Transmission Control Protocol (TCP) and the User Datagram Protocol (UDP), the port numbers range from 1-65,535. There are three categories of port numbers: (1) port numbers 1-1023 are well known ports which are associated with system processes of widely used network services; (2) port numbers 1024-49151 are registered ports which are assigned by the Internet Assigned Numbers Authority (IANA) and used with a certain protocol or application; and (3) port numbers 49152-65535 are private or dynamic ports that are active for a particular session.

Common port numbers include the following:
21: File Transfer Protocol (FTP)
22: Secure Shell (SSH)
23: Telnet remote login service
25: Simple Mail Transfer Protocol (SMTP)
53: Domain Name System (DNS) service
80: Hypertext Transfer Protocol (HTTP)
110: Post Office Protocol (POPS)
119: Network News Transfer Protocol (NNTP)
123: Network Time Protocol (NTP)
143: Internet Message Access Protocol (IMAP)
161: Simple Network Management Protocol (SNMP)
194: Internet Relay Chat (IRC)
443: HTTP Secure (HTTPS)

The computing device 102 receives sampled network flow data (i.e., network traffic) 112 from network devices, such as routers, switches, and/or firewalls. The network flow data 112 represents the network packets transmitted to and from entities 104 that belong to the same connection. The sampled network flow data 112 may be obtained using a network flow component 109 that operates in accordance with a network flow protocol, such as the Internet Protocol Flow Information Export (IPFIX) protocol. The IPFIX protocol defines the manner in which the network flow data is formatted and transmitted from a collector to a controller, such as from a router (i.e., collector) 110 to the computing device 102 (i.e. controller).

In one aspect, the system 100 uses routers 110 to forward data packets between computer networks to aggregate and format the network flow data in accordance with the IPFIX protocol. However, it should be noted that the system is not limited to routers and other network devices (e.g., switches, firewalls, etc.) may be utilized to forward the network flow data. Also, the system is not limited to the IPFIX protocol. Other network flow protocols may be utilized that provide the same functionality.

The computing device 102 may include an entity-port mapping component 114, a collaborative filtering component 118, and a port recommendation component 122. The entity-port mapping component 114 generates the entity-port matrix or model 116 that tracks the usage of the open ports for each entity of a network for legitimate workloads (i.e., non-malicious activity). The entity-port mapping component 114 uses the network flow data 112 to generate the frequency, $r_{ui}$, that port i on entity u, is open and used for a non-anomalous workload.

The collaborative filtering component 118 transforms the frequencies, $r_{ui}$, into preference and confidence pairs 126. The preference and confidence pairs 126 are used in the alternating least squares approximation to predict missing values in the entity-port matrix 116. The entity-port matrix 116 is typically a sparse matrix having values derived from the settings in the network packets. A missing value is not indicative of an open port being used for malicious activity or a legitimate workload. Instead, the collaborative filtering component 118 predicts these missing values through an alternating least squares technique.

The collaborative filtering component 118 uses singular value decomposition 128 to decompose the entity-port matrix 116 into two smaller matrices, X and Y, that are used to generate a recommendation score indicative of whether activity on each port is part of a legitimate workload. In particular, collaborative filtering is used to detect patterns in network traffic indicative of an association between entities that utilize the same open port.

The port recommendation component 122 uses the X and Y matrices 120 to make recommendations on the viability of a specific open port being used for a legitimate purpose. The port recommendation component 124 receives the real-time network flow data 112 which is analyzed for the existence of a newly-opened port on an existing entity. The port recommendation component 120 generates a recommendation score indicative of the likelihood that the entity uses the newly-opened port for legitimate workload. The recommendation score is based on computations derived from the dot product of $X_u * Y^T$ 130. When the recommendation score is below a threshold, the newly-opened port is predicted to be an anomalous port and an alert 124 is raised.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Attention now turns to descriptions of the various exemplary methods that utilize the system and devices disclosed herein.

Methods

Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

A recommender system is an information filtering technique that aims to predict a preference of a user to an item. Recommender systems are used to generate recommendations of an item of interest based on the user's preference to other items. There are two main types of recommender systems: collaborative filtering; and content-based filtering. Content-based filtering recommends items based on a comparison of a content of an item and a user profile.

Collaborative filtering builds a model or matrix based on the aggregated behavior of a large number of users with the items to recommend relevant items to specific users. The models can be further classified into implicit and explicit feedback-based methods. An explicit-feedback method uses explicit information on a user's item preference, typically in the form of a rating. Implicit feedback is derived from the user's history with the item, such as the user's usage of an item.

Collaborative filtering techniques can be classified into memory-based techniques and model-based techniques. A memory-based technique uses arithmetic operations such as cosine similarity and Pearson correlation coefficients to find the closest similar user or similar item. A model-based technique generates a matrix or model to capture the user-item preferences. The matrices are typically sparse since there is not a value for every user-item preference. The missing values are predicted rather than set to zero. Since the matrix is very large, the matrix is decomposed through matrix factorization into a smaller feature space in order to find a hidden feature space where the users and items have feature vectors that are closely aligned.

Matrix factorization is applied to the original matrix to mathematically reduce the dimensionality of the original matrix into the product of two lower dimension matrices. The two lower dimension matrices represent all users by a particular item dimension and all items by a particular user dimension. The main hurdle of matrix factorization is estimating the missing values for a user-item pair. This is done by using linear regression methods repeatedly to estimate the parameter values and minimizing the error between the predicted value and the actual value.

In one aspect of the disclosure, a collaborative filtering technique using implicit feedback datasets is employed for the real-time detection of a compromised machine based on port similarity. The technique generates a model or matrix A of entity-port pairs, $r_{ui}$, where u is an entity and i is an open port on entity u. An entity-port pair, $r_{ui}$, represents the frequency that an entity u uses port i to transmit and/or receive transmissions. and that port i is open from The TCP SYN-ACK settings in the transmissions captured in the network flow data identify whether port i is an open port.

The raw observation values, $r_{ui}$, are transformed into two values with distinct interpretations: preferences, $p_{ui}$, and confidence levels, $c_{ui}$. A preference, $p_{ui}$, indicates that an entity u uses port i for legitimate workloads. When the raw data indicates that entity u uses port i frequently, then the preference $p_{ui}$ is positive and when entity u has not used port i, then preference $p_{ui}$ is zero. Hence, preference $p_{ui}$ is computed as follows:

$$p_{ui}=1, r_{ui}>0 \text{ and } p_{ui}=0, r_{ui}=0.$$

A confidence level, $c_{ui}$, is associated with entity u and port i to indicate a level of confidence for the preference being used for legitimate workloads. The confidence level may be expressed as $c_{ui}=1+\alpha r_{ui}$, where $\alpha$ controls the rate of increase. The confidence level is based on the magnitude of the feedback data thereby generating a larger confidence the more times an open port is used by an entity.

The matrix A of size m×n is then decomposed, using singular value decomposition to, into two smaller matrices: X of size m×f; and Y, of size f×n. X and Y have weights for how each entity-port pair relate. X and Y are generated by randomly assigning values in X and Y and using alternating least squares iteratively to optimize X and fixing Y, and vice versa, until a best approximation of A is achieved.

The goal is then to find a vector $x_u$ for each entity u and a vector $y_i$ for each port i that will factor entity preferences. The entity preferences are the inner product $p_{ui}=x_u^T y_i$. The vectors $x_u$ are considered the entity factors and the vectors $y_i$ are considered the port factors. These vectors map entities and ports into a common latent factor space where they can be compared. These factors are computed by minimizing the following cost function:

$$\min x_u, y_i \Sigma c_{ui}(p_{ui}-x_u^T y_i)^2+\lambda(\Sigma_u\|x_u\|^2+\Sigma_i\|y_i\|^2). \qquad (1)$$

An expression for $x_u$ that minimizes cost function (1) is as follows:

$$x_u=(Y^T C^u Y+\lambda I)^{-1} Y^T C^u p(u). \qquad (2)$$

The expression for $y_i$ that minimizes cost function (1) is as follows:

$$y_i = (X^T C^u X + \lambda I)^{-1} X^T C^i p(i). \quad (3)$$

The port factors, $y_i$, are gathered within an n×f matrix Y. The entity factors, $x_u$, are gathered within a f×m matrix X.

To calculate the similarity between entities, a recommendation score is generated which is the dot product between an entity vector and the transpose of the port vectors, $X_u * Y^T$, where $X_u$ is the entity vector for entity u and $Y^T$ is the transpose of the port vectors. This result provides a recommendation score for entity u and each of the ports. The recommendation score indicates whether or not a port should be open. When the recommendation score for entity u and port i is below a threshold, the recommendation score indicates that the port should not be open. The threshold is determined through cross-validation. In this case, an alert is generated. The alert may be a message that is transmitted to the network administrator or the entity administrator of the impacted entity.

Figure 2:
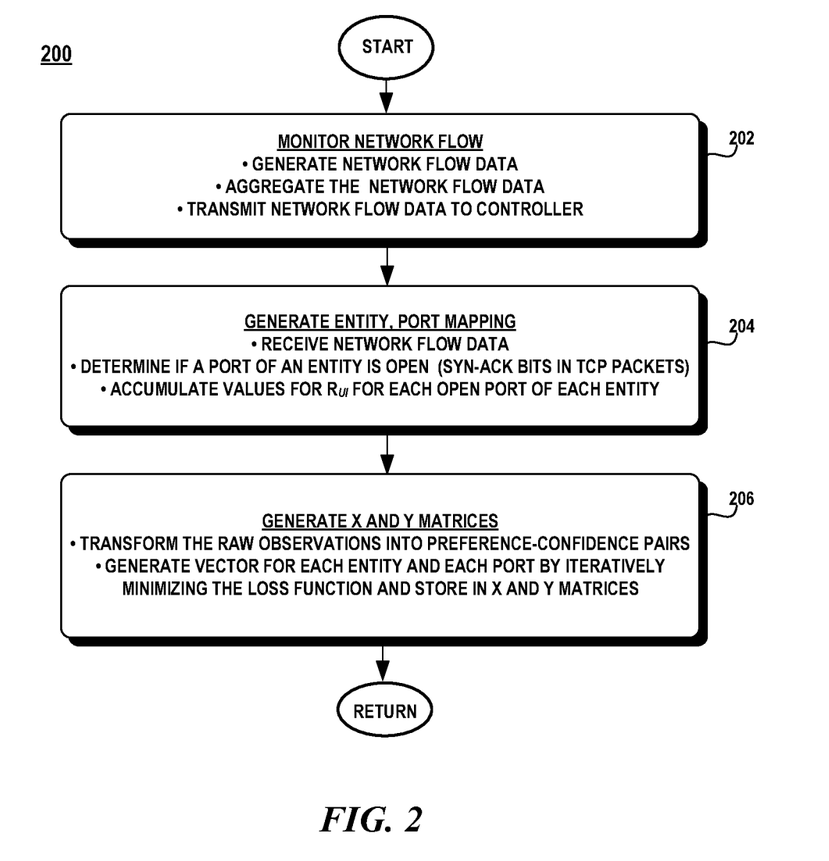
FIG. 2 is a flow diagram illustrating an exemplary method for generating a collaborative filtering model using implicit feedback datasets.

Turning to FIG. 2, there is shown an exemplary method for generating a collaborative filtering model of network activity using implicit datasets. Entities that communicate within a network are monitored by analyzing the packets that are transmitted to and from each entity. In one aspect, a network flow component 109 resident on a designated network entity, such as a router, switch, or firewall, collects data on the packets received from and transmitted through the network. The network flow component 109 aggregates the data and transmits it to a controller, such as computing device 102 (block 202)

The network flow component 109 may utilize a network data flow protocol, such as IPFIX, which indicates how the data is to be formatted and transmitted to the controller. The IPFIX data includes information on the source IPv4 address, the destination IPv4 address, the source transport port, the destination transport port, and TCP control bits of a packet. The TCP control bits include SYN and ACK flags. The SYN and ACK flags are set during the initiation of a TCP connection with a client requesting a connection. The client sends a SYN message to a server. The server acknowledges this request with a SYN-ACK message back to the client from a particular port thereby indicating that the port is open. When both the SYN and ACK flags are set in TCP control bits, the corresponding source transport port is considered open and the corresponding entity-port pair $r_{ui}$ is updated in the entity-port matrix 116.

The computing device 102 collects the network flow data 112 over a designated time period (block 204). During the designated time period, the entity-port mapping component 114 generates an entity-port matrix 116 that tracks for each entity the number of times a packet is transmitted to or from an open port on the entity (block 204). In one aspect, the entity-port matrix 116 is configured to have a row for each entity and a column for each available port. An entity can be identified by an IP address and there is an entry in the entity-port matrix for each sourceIP4address and for each destinationIP4address. The value for an entity-port pair, $r_{ui}$, represents a count of the number of times port i has received or sent a packet to or from entity u (block 204). The count $r_{ui}$ is incremented on the existence of the setting of the SYN-ACK bits (block 204).

After a threshold amount of network flow data has been collected, the observations $r_{ui}$ are transformed into preference-confidence pairs, preferences, $p_{ui}$, and confidence levels, $c_{ui}$ (block 206). A preference, $p_{ui}$, indicates that an entity u uses port i for legitimate workloads. A preference $p_{ui}$ is computed as follows: $p_{ui}=1$, $r_{ui}>0$ and $p_{ui}=0$, $r_{ui}=0$. A confidence level, $c_{ui}$, is associated with entity u and port i to indicate a confidence level of the preference being used for legitimate workloads. The confidence level may be expressed as $c_{ui}=1+\alpha r_{ui}$, where $\alpha$ controls the rate of increase.

Next, the collaborative filtering component uses singular value decomposition with alternating least squares to generate the entity vectors and the port vectors that minimize the cost function for the entity factor and the cost function for the port factor (block 206). As noted above, the cost functions (2)-(3) are iteratively computed over a predetermined number of iterations generating entity and port vectors that are stored in matrices X and Y (block 206).

It should be noted that the X and Y matrices may be generated initially and updated at periodic intervals. When these matrices need to be updated to reflect the current network data flow, blocks 202-206 are repeated to reflect the current entity/port status of a network.

Figure 3:
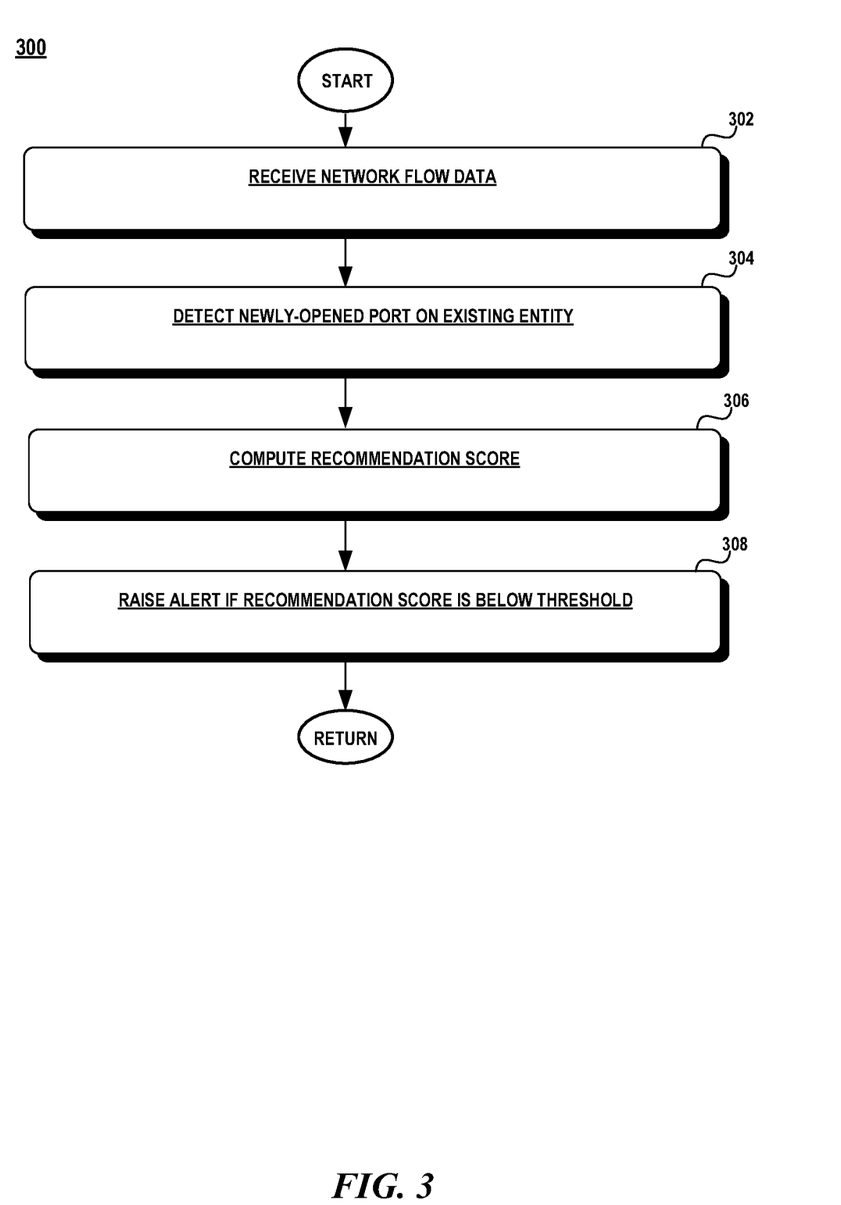
FIG. 3 is a flow diagram illustrating an exemplary method for detecting an anomalous port through the collaborative filtering model.

Turning to FIG. 3, there is shown an exemplary method illustrating the determination by the port recommendation component 124 whether a newly opened port is anomalous. The port recommendation component 124 obtains network flow data 112 in real-time (block 302). The port recommendation component 124 identifies from the network flow data 112 a newly-opened port on an existing entity (block 304).

The port recommendation component 120 uses the X and Y matrices to generate a recommendation score for the entity having the newly-opened port (block 306). The recommendation score for the entity u is compared against a threshold to determine whether the newly-opened port is an anomalous port used for malicious activities or an open port used for legitimate purposes (block 306).

When the newly-opened port is determined to be an anomalous port, an alert 124 is raised (block 308). The alert signifies that there is a possibility that the newly-opened port may be used for malicious activity. Otherwise, the system continues analyzing the network flow data for other newly-opened ports.

Operating Environment

Figure 4:
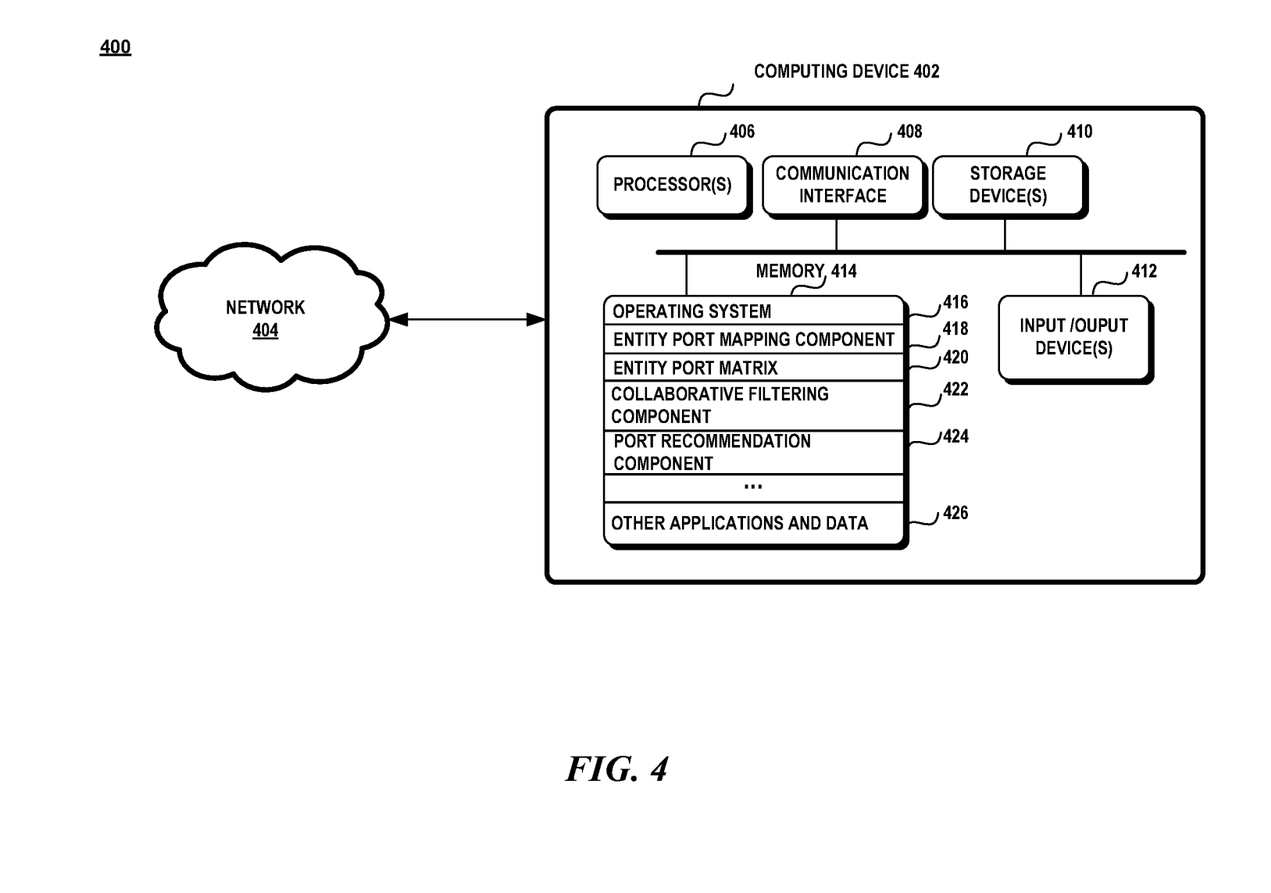
FIG. 4 is a block diagram illustrating an exemplary computing or operating environment.

Attention now turns to a discussion of an exemplary operating environment. It should be noted that the operating environment 400 is exemplary and is not intended to suggest any limitation as to the functionality of the embodiments. The embodiments may be applied to an operating environment 400 utilizing a computing device coupled to a network 404.

The computing device 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 402 may include one or more processors 406, a memory 414, a communication interface 408, storage devices 410, and input/output devices 412. A processor 406 may be any commercially available processor and may include dual microprocessors and multi-processor architectures. The communication interface 408 facilitates wired or wireless communications between the computing device 402 and other devices. The storage devices 410 may be computer-readable medium that does not contain propagating signals, such as modulated data signals transmitted through a carrier wave. Examples of the storage devices 410 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input devices 412 may include a keyboard, mouse, pen, voice input device, touch input device, etc., and any combination thereof. The output devices 412 may include a display, speakers, printers, etc., and any combination thereof.

The memory 414 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 414 may also include one or more external storage devices or remotely located storage devices that do not pertain to propagated signals, such as modulated data signals transmitted through a carrier wave. The memory 414 may contain instructions, components, and data, such as an operating system 416, an entity port mapping component 418, an entity-port matrix or model 420, a collaborative filtering component 422, a port recommendation component 424, and other applications and data 426.

The computing device 402 is communicatively coupled to a network 404 facilitates communications with other entities. The network 402 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

CONCLUSION

A system is disclosed having one or more processors and one or more memory devices that store instructions. The stored instructions are configured to be executed by the one or more processors to perform actions that: monitor network traffic flow to one or more open ports of one or more entities in a network; detect a newly-opened port on a first entity; determine whether the newly-opened port on the first entity is likely to be used for malicious activity based on a collaborative filtering model, the collaborative filtering model based on implicit datasets, the implicit datasets including usage patterns of the one or more open ports of the one or more entities for non-malicious activity; and issue an alert when the newly-opened port is determined to be used for malicious activity.

The system performs additional actions to: structure data from the network traffic flow into an entity-port model that reflects the usage of the one or more open ports by the one or more entities for non-malicious activity; perform single value decomposition with alternative least squares to decompose the entity-port model into a first matrix of entity factors and a second matrix of port factors; and use the first matrix and the second matrix to generate a recommendation score indicative of whether the newly-opened port is an anomalous port.

The usage patterns are obtained from synchronize (SYN) and acknowledgement (ACK) settings in transmission control protocol (TCP) packets. The network flow data is derived from Internet Protocol Flow Information Export (IPFIX) data. The entity-port model is updated with additional data from the network traffic flow at periodic intervals. An alert is raised when the recommendation score is below a threshold. Prior to performing single value decomposition, an entity-port pair is transformed into a preference and confidence pair.

A device is disclosed having at least one processor and at least one memory device. The at least one processor is configured to: obtain a collaborative filtering model to represent one or more open ports of a plurality of entities of a network, wherein the one or more open ports for used for non-malicious activity; detect in real-time a newly-opened port for a first entity of the plurality of entities; utilize the collaborative filtering model to determine a likelihood that the newly-opened port is an anomalous port; and upon the determination that the newly-opened port is determined to be anomalous, raise an alert in real-time to deter usage of the anomalous port.

The device is further configured to construct the collaborative filtering model using implicit datasets, the implicit datasets derived from settings in transmission packets distributed in the network. Further actions performed by the device include generating an entity-port model representing a value identifying a usage frequency of an open port for an entity; and applying singular value decomposition with alternating least squares to estimate a missing value for a port of an entity, the application generating a first matrix representing entity factors and a second matrix representing port factors. A recommendation score for the first entity and the newly-opened port is based on the first matrix and the second matrix. When the recommendation score is below a threshold, an alert is raised.

A method is disclosed that may be practiced on the system and device described herein that operates on a computing device having at least one processor and at least one memory. The method obtains an entity-port model that reflects usage of one or more open ports of one or more entities of a network used for non-malicious activity, estimates usage of non-open ports of the one or more entities using matrix factorization with linear regression, decomposes the entity-port model into entity factors and port factors, generates a recommendation score from the entity factors and the port factors for a newly-open port of a select entity, where the recommendation score indicative of whether the newly-opened port is an anomalous port, and raises an alert when the recommendation score indicates a probability that the newly-opened port is an anomalous port.

The normal network activity used at open ports of the one or more entities of a network is monitored and collaborated into the entity-port model by associating a frequency usage value for each entity-port pair. The SYN-ACK settings on transmission packets is analyzed to determine the open ports of an entity of the network. The entity-port model is updated periodically with additional data from monitoring the normal network activity. The decomposition of the entity-port model into entity factors and port factors associates a preference-confidence pair to each value in the entity-port model, the preference-conference pair including a preference value and a confidence value, the preference value based on the usage frequency and the confidence value based on a magnitude of the usage frequency, and applies the matrix factorization on the preference-confidence pairs.

The matrix factorization applies an alternating least squares technique to minimize a cost function for the entity factors and a cost function to minimize the port factors. The matrix factorization applies single value decomposition. The recommendation score is determined in real-time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
one or more processors; and
one or more memory devices that store instructions configured to be executed by the one or more processors to perform actions that:
monitor network traffic flow through a plurality of open ports of a plurality of entities in a network;
construct a collaborative filtering model based on implicit datasets, the implicit datasets including a plurality of usage patterns of the plurality of open ports of the plurality of entities for non-malicious activity, wherein the collaborative filtering model includes a plurality of entity-port pairs, wherein an entity-port pair contains a frequency of a select one of the plurality of entities of a select one of the plurality of ports;
decompose the collaborative filtering model into a first matrix and a second matrix, the first matrix including a plurality of entity vectors, the second matrix including a plurality of port vectors;
detect a newly-opened port on a first entity;
determine whether the newly-opened port on the first entity is likely to be used for malicious activity from a recommendation score based on an entity vector for the first entity from the first matrix and the port vectors of the second matrix; and
issue an alert when the recommendation score determines that the newly-opened port is used for malicious activity.

2. The system of claim 1, wherein the one or more memory devices store instructions that when executed by the one or more processors performs actions that:
perform single value decomposition with alternative least squares to decompose the entity-port model into the first matrix and the second matrix.

3. The system of claim 1, wherein the one or more memory devices store instructions that when executed by the one or more processors performs actions that:
obtain the plurality of usage patterns from synchronize (SYN) and acknowledgement (ACK) settings in transmission control protocol (TCP) packets.

4. The system of claim 1, wherein the plurality of usage patterns are is derived from Internet Protocol Flow Information Export (IPFIX) data.

5. The system of claim 1, wherein the one or more memory devices store instructions that when executed by the one or more processors performs actions that:
update the collaborative filtering model with additional data from the network traffic flow at periodic intervals.

6. The system of claim 1, wherein the one or more memory devices store instructions that when executed by the one or more processors performs actions that:
raise an alert when the recommendation score is below a threshold.

7. The system of claim 2, wherein the one or more memory devices store instructions that when executed by the one or more processors performs actions that:
prior to perform single value decomposition, transform each entity-port pair into a preference and confidence pair, wherein the preference and confidence pairs are used to map the plurality of entities and the plurality ports into a common factor space.

8. A device, comprising:
at least one processor and at least one memory device;
wherein the at least one processor is configured to perform actions that:
obtain a collaborative filtering model to represent usage of a plurality of open ports of a plurality of entities of a network, wherein the usage of the plurality of open ports in the collaborative filtering model are used for non-malicious activity;
construct a first matrix and a second matrix from the collaborative filtering model, the first matrix including a plurality of entity vectors, the second matrix including a plurality of port vectors;
detect in real-time a newly-opened port for a first entity of the plurality of entities;
utilize a recommendation score to determine a likelihood that the newly-opened port is an anomalous port, wherein the recommendation score is based on an entity vector from the first matrix for the first entity and the port vectors of the second matrix; and
upon the determination from the recommendation score that the newly-opened port is anomalous, raise an alert in real-time to deter usage of the anomalous port.

9. The device of claim 8, wherein the at least one processor is further configured to perform actions that:
construct the collaborative filtering model using implicit datasets, the implicit datasets derived from settings in transmission packets distributed in the network.

10. The device of claim 8, wherein the at least one processor is further configured to perform actions that:
apply singular value decomposition with alternating least squares to estimate a missing value for a port of an entity in the collaborative filtering model.

11. The device of claim 10, wherein the at least one processor is further configured to perform actions that:
transform each entity-port pair into a preference and confidence pair; and
utilize the preference and confidence pairs into entity factors and port factors, wherein the entity factors are included in the first matrix and the port factor are included in the second matrix.

12. The device of claim 8, wherein the at least one processor is further configured to perform actions that:
when the recommendation score is a product of the entity vector of the first entity in the first matrix and a transpose of the port vectors of the second matrix.

* * * * *